United States Patent [19]
Johnson

[11] 4,230,331
[45] Oct. 28, 1980

[54] RIDER PROPELLED TOY VEHICLE

[76] Inventor: Sterling V. Johnson, 916 NE. 16, Oklahoma City, Okla. 73104

[21] Appl. No.: 17,294

[22] Filed: Mar. 5, 1979

[51] Int. Cl.³ ............................................. B62M 29/00
[52] U.S. Cl. ............................ 280/218; 280/87.04 R; 280/221
[58] Field of Search ............ 280/218, 221, 210, 87.01, 280/87.03, 87.04 R, 1.175, 1.177, 1.181, 1.183

[56] References Cited
U.S. PATENT DOCUMENTS

| | | | |
|---|---|---|---|
| 1,377,948 | 5/1921 | Wacker | 280/87.04 R |
| 1,607,972 | 11/1926 | Wagner | 280/210 |
| 2,209,175 | 7/1940 | Snell | 280/282 |
| 2,423,590 | 7/1947 | Fageol | 280/282 |
| 3,993,320 | 11/1976 | Robinson | 280/204 |

*Primary Examiner*—John P. Silverstrim
*Attorney, Agent, or Firm*—Robert K. Rhea

[57] ABSTRACT

A generally T-shaped wheeled support frame is provided with an upstanding hand grip bar and a rearward foot supporting tailpiece pivotally connected for horizontal movement with the hand grip bar by a flexible shaft permitting the user to generate forward movement of the frame by lateral to and fro bending movement of the shaft and pivoting movement of the tailpiece.

3 Claims, 2 Drawing Figures

RIDER PROPELLED TOY VEHICLE

BACKGROUND OF THE INVENTION

1. Field of the invention

The present invention relates to toys and more particularly to a rider propelled toy vehicle.

2. Description of the prior art

The prior art generally discloses toy vehicles which are propelled by the occupant operating pedals or a wheeled platform on which the operator stands on with one foot and propels himself and the vehicle by his other foot contacting the surface of the earth.

This invention is distinctive over occupant propelled toy vehicles by forming a generally t-shaped frame having a flexible stem portion pivotally connected with a tailpiece on which the operator stands and propells the vehicle by body and leg twisting movements.

SUMMARY OF THE INVENTION

A generally T-shaped in plan view wheel supported frame, having an upstanding forward wheel supported hand grip member, includes a flexible stem portion. The rearward end of the stem is pivotally connected medially the ends of a horizontal transversely disposed caster wheel equipped foot supporting tailpiece. To and fro twisting movement of the hips and legs of the operator while standing on and horizontally pivoting the tailpiece horizontally bends the stem in a lateral to and fro fishtail movement which propels the frame forwardly.

The principal object of this invention is to provide a toy vehicle frame which is propelled by the operator twisting and pivoting the rearward end portion of the frame in lateral directions while supported by the frame to induce forward movement.

DESCRIPTION OF THE PREFERRED EMBODIMENT

Figure 1:
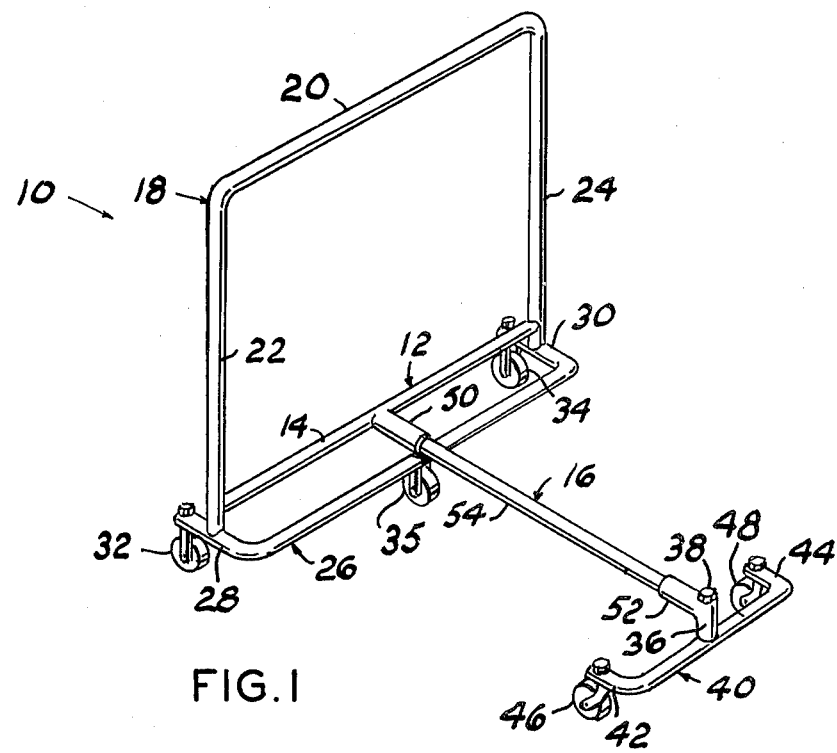
FIG. 1 is a perspective view of the device.

Like characters of reference designate like parts in those figures of the drawings in which they occur.

In the drawings:

The reference numeral 10 indicates the device, as a whole, which is substantially T-shaped in top view. The device 10 comprises a rod-like open framework formed by a horizontally disposed T-shaped portion 12 defined by a cross bar 14 and a stem portion 16. An upstanding inverted U-shaped hand grip bar 18, having a horizontally disposed bight portion 20, has the depending end portions of its legs 22 and 24 interconnected by the cross bar 14. A horizontally disposed U-shaped axle 26 has its forwardly projecting leg members 28 and 30 connected intermediate their ends with the depending end of the respective hand bar leg 22 and 24. A pair of wheels 32 and 34 are connected in depending relation with the forward end portion of the respective axle legs 28 and 30 with the axis of the respective wheel parallel with the cross bar 14. A third wheel 35 depends from the bight portion of the axle medially its ends.

The rearward end portion of the stem 16 is turned downwardly, as at 36, and pivotally connected by a bolt 38, extending vertically through the member 36, with a horizontally disposed tailpiece 40 medially its ends. The tailpiece 40 is similarly generally U-shaped having relatively short forwardly projecting legs 42 and 44 pivotally connected adjacent their forward ends with a pair of depending caster wheels 46 and 48, respectively.

The stem 16 is characterized by a forward coupling 50 secured to the cross bar 14 medially its ends and a rearward coupling 52 integral wih the member 36 for telescopically receiving respective end portions of an elongated fiber glass rod 54.

OPERATION

Figure 2:
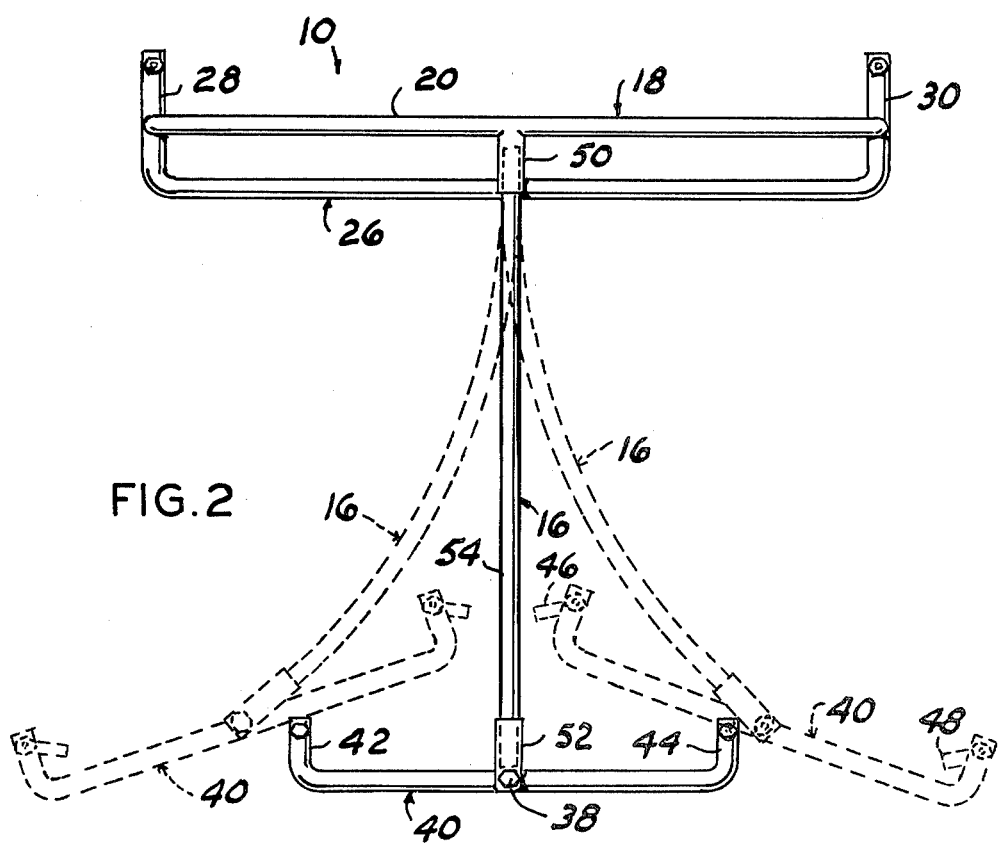
FIG. 2 is a top view, to a larger scale, illustrating, by dotted lines, lateral bending and pivoting movement of the rearward end portion of the device.

In operation, the toy is disposed on a flat surface, such as a concrete sidewalk or driveway, and the operator stands with his feet on the tailpiece bight portion, on opposing sides of the member 36, and leans forwardly with his hands grasping the bight portion 20 of the hand bar. By alternately twisting his hips and legs toward the right and then toward the left, as viewed in FIG. 2, generating horizontal pivoting movement of the tailpiece 40 about the vertical axis of the bolt 38, the tailpiece is moved laterally in a to and fro action, permitted by bending the fiber glass rod 54, as illustrated by dotted lines (FIG. 2), which generates forward movement of the device 10 and the rider.

Obviously the invention is susceptible to changes or alterations without defeating its practicability. Therefore, I do not wish to be confined to the preferred embodiment shown in the drawings and described herein.

I claim:

1. An occupant propelled toy vehicle, comprising:

a generally horizontally disposed substantially T-shaped frame having a cross bar portion and a stem portion;

hand grip means projecting vertically above said cross bar portion in coextensive parallel relation;

tailpiece means connected with the end of said stem opposite said cross bar portion for supporting the feet of an occupant, said stem portion being formed from flexible material capable of being arcuately bent and returning to a position of repose in a horizontal plane in response to lateral force applied thereto by the occupant while standing on said tailpiece means; and, wheel means for supporting said frame.

2. The toy vehicle according to claim 1 in which said tailpiece means comprises:

a horizontally disposed U-shaped member having its legs normally projecting toward said cross bar portion and having its bight portion pivotally connected, intermediate its ends, with said stem portion for horizontal pivoting movement about a vertical axis.

3. The toy vehicle according to claim 2 in which the wheel means includes:

caster wheels pivotally connected with the legs of said U-shaped member, whereby an occupant, when standing on said tailpiece means and grasping said hand grip means, may generate forward movement of the vehicle by alternate twisting and lateral movement of his legs and hips in opposing directions thus pivoting said U-shaped member and bending said stem portion.

* * * * *